US010635927B2

(12) United States Patent
Chen et al.

(10) Patent No.: US 10,635,927 B2
(45) Date of Patent: Apr. 28, 2020

(54) SYSTEMS FOR PERFORMING SEMANTIC SEGMENTATION AND METHODS THEREOF

(71) Applicant: HONDA MOTOR CO., LTD., Minato-ku, Tokyo (JP)

(72) Inventors: Yi-Ting Chen, Raymond, OH (US); Athmanarayanan Lakshmi Narayanan, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 15/912,242

(22) Filed: Mar. 5, 2018

(65) Prior Publication Data

US 2018/0253622 A1  Sep. 6, 2018

Related U.S. Application Data

(60) Provisional application No. 62/467,642, filed on Mar. 6, 2017.

(51) Int. Cl.
*G06K 9/34* (2006.01)
*G06K 9/46* (2006.01)
(Continued)

(52) U.S. Cl.
CPC ......... *G06K 9/4671* (2013.01); *G06K 9/3241* (2013.01); *G06K 9/34* (2013.01); *G06K 9/4609* (2013.01); *G06K 9/4628* (2013.01); *G06K 9/627* (2013.01); *G06N 3/0454* (2013.01); *G06N 3/08* (2013.01); *G06N 7/005* (2013.01); *G06T 7/11* (2017.01); *G06K 9/00791* (2013.01);
(Continued)

(58) Field of Classification Search
CPC .. G06K 9/4671; G06K 9/3241; G06K 9/4609; G06K 9/627; G06K 9/4628; G06K 9/34; G06K 9/00791; G06T 7/11; G06T 2207/30261; G06T 2207/30196; G06T 2207/20084; G06T 2207/20081; G06T 2207/10024; G06N 3/0454; G06N 7/005; G06N 3/08
USPC ....................................................... 382/180
See application file for complete search history.

(56) References Cited

U.S. PATENT DOCUMENTS 5,455,898 A    10/1995  Mahoney et al.
2007/0009153 A1  1/2007  Gallafent et al.
(Continued)

OTHER PUBLICATIONS

Liang, Xiaodan, et al. "Proposal-free Network for Instance-level Object Segmentation." arXiv preprint arXiv:1509.02636 (2015) (Year: 2015).*

(Continued)

*Primary Examiner* — Andrew M Moyer
(74) *Attorney, Agent, or Firm* — Arent Fox LLP (57) ABSTRACT

Performing semantic segmentation of an image can include processing the image using a plurality of convolutional layers to generate one or more feature maps, providing at least one of the one or more feature maps to multiple segmentation branches, and generating segmentations of the image based on the multiple segmentation branches, including providing feedback to, or generating feedback from, at least one of the multiple segmentation branches in performing segmentation in another of the segmentation branches.

18 Claims, 6 Drawing Sheets
(1 of 6 Drawing Sheet(s) Filed in Color)

(51) Int. Cl.
  G06K 9/32       (2006.01)
  G06K 9/62       (2006.01)
  G06N 3/04       (2006.01)
  G06T 7/11       (2017.01)
  G06N 3/08       (2006.01)
  G06N 7/00       (2006.01)
  G06K 9/00       (2006.01)

(52) U.S. Cl.
  CPC .............. *G06T 2207/10024* (2013.01); *G06T 2207/20081* (2013.01); *G06T 2207/20084* (2013.01); *G06T 2207/30196* (2013.01); *G06T 2207/30261* (2013.01)

(56) References Cited

U.S. PATENT DOCUMENTS

| | | | |
|---|---|---|---|
| 2007/0025622 | A1 | 2/2007 | Simard, III et al. |
| 2008/0075361 | A1 | 3/2008 | Winn et al. |
| 2008/0118118 | A1 | 5/2008 | Berger |
| 2008/0123945 | A1 | 5/2008 | Andrew et al. |
| 2008/0304735 | A1 | 12/2008 | Yang et al. |
| 2008/0310717 | A1 | 12/2008 | Saathoff et al. |
| 2009/0003691 | A1 | 1/2009 | Padfield et al. |
| 2009/0148041 | A1 | 6/2009 | Piramuthu |
| 2010/0040285 | A1 | 2/2010 | Csurka et al. |
| 2010/0232698 | A1 | 9/2010 | Bentrem |
| 2010/0310159 | A1 | 12/2010 | Ranganathan |
| 2010/0322518 | A1 | 12/2010 | Prasad et al. |
| 2011/0206276 | A1 | 8/2011 | Lin et al. |
| 2012/0041722 | A1 | 2/2012 | Quan et al. |
| 2012/0148162 | A1 | 6/2012 | Zhang et al. |
| 2014/0304271 | A1 | 10/2014 | Lu et al. |
| 2015/0170006 | A1 | 6/2015 | Cohen et al. |
| 2015/0363660 | A1 | 12/2015 | Vidal et al. |
| 2016/0180195 | A1 | 6/2016 | Martinson et al. |
| 2016/0224859 | A1 | 8/2016 | Usikov |
| 2016/0358337 | A1* | 12/2016 | Dai .......................... G06T 5/10 |

OTHER PUBLICATIONS

Gao, Yang, et al. "Compact bilinear pooling." Proceedings of the IEEE conference on computer vision and pattern recognition. 2016. (Year: 2016).*
Arnab, Anurag, and Philip HS Torr. "Bottom-up instance segmentation using deep higher-order crfs." arXiv preprint arXiv: 1609.02583 (2016). (Year: 2016).*
Liang, Xiaodan, et al. "Proposal-free Network for Instance-level Object Segmentation." arXiv preprint arXiv:1509.02636 (2015) (Year: 2015).*
Gao, Yang, et al. "Compact bilinear pooling." Proceedings of the IEEE conference on computer vision and pattern recognition. 2016. (Year: 2016).*
Arnab, Anurag, and Philip HS Torr. "Bottom-up instance segmentation using deep higher-order crfs."nbsp;arXiv preprint arXiv: 1609.02583nbsp;(2016). (Year: 2016).*
Abhinav Shrivastava et al., "Contextual Priming and Feedback for Faster R-CNN", in ECCV, 2016.
Abhinav Shrivastava et al., "Training Region-based Object Detectors with Online Hard Example Mining", in CVPR, 2016.
Akira Fukui et al., "Multimodal Compact Bilinear Pooling for Visual Question Answering and Visual Grounding", arXiv:1606.01847v3. Sep. 24, 2016.
Alex Krizhevsky et al., "ImageNet Classification with Deep Convolutional Neural Networks", In NIPS, 2012.
Anurag Arnab et al., "Bottom-up Instance Segmentation using Deep Highher-Order CRFs" arXiv:1609.02583, Sep. 8, 2016.
Anurag Arnab et al., "Higher Order Conditional Random Fields in Deep Neural Networks", arXiv:1511.08119v3, Mar. 30, 2016.
Anurag Arnab et al., Pixelwise Instance Segmentation with a Dynamically Instantiated Network, in CVPR, 2017.
Bernardino Romera-Paredes et al., "Recurrent Instance Segmentation", arXiv:1511.08250v3, Oct. 24, 2016.
Bharath Hariharan et al., "Hypercolumns for Object Segmentation and Fine-grained Localization" Proceedings of the IEEE Conference on Computer Vision and Pattern Recognition: pp. 447-456, 2015.
Bharath Hariharan et al., "Simultaneous Detection and Segmentation" arXiv:1407.1808v1, Jul. 7, 2014.
Carsten Rother et al., "GrabCut"—Interactive Foreground Extraction using Iterated Graph Cuts, In SIGGRAPH, 2004.
Daniel Maturana et al., "VoxNet: A 3D Convolutional Neural Network for Real-Time Object Recognition", International Conference on Intelligent Robots and Systems (IROS) 2015.
David Held et al., "Combining 3D Shape, Color, and Motion for Robust Anytime Tracking", Robotics: Science and Systems (RSS), 2014.
Diane Larlus et al., "Category Level Object Segmentation by Combining Bag-of-Words Models with Dirichlet Processes and Random Fields" Journal of Computer Vision; 88(2): pp. 238-253, May 20, 2009.
Guosheng Lin et al., "Efficient Piecewise Training of Deep Structured Models for Semantic Segmentation", in CVPR, 2016.
Hengshuang Zhao et al., "Pyramid Scene Parsing Network", in CVPR, 2017.
Hyeonwoo Noh et al., "Learning Deconvolution Network for Semantc Segmentation" in ICCV, 2015.
J.R. R. Uijlings et al., "Selective Search for Object Recognition." Int J Comput Vis, vol. 104, pp. 154-171, 2013.
Jia Deng et al., "ImageNet: A Large-Scale Hierarchial Image Database" IEEE, 2009.
Jian Dong et al., "Towards Unified Object Detection and Semantic Segmentation" in ECCV, 2014.
Jian Yao et al., "Describing the Scene as a Whole: Joint Object Detection, Scene Classification and Semantic Segmentation", IEEE, 2012.
Jifeng Dai et al., "Instance-aware Semantic Segmentation via Multi-task Network Cascades" arXiv:1512.04412, Dec. 14, 2015.
Jifeng Dai et al., "Convolutional Feature Masking for Joint Object and Stuff Segmentation" CVPR, 2015.
Jifeng Dai et al., "R-FCN: Objecct Detection via Region-based Fully Convolutional Networks" in NIPS, 2016.
Jonas Uhrig et al., "Pixel-level Encoding and Depth Layering for Instance-level Semantic Labeling" arXiv.1604.05096v2, Jul. 14, 2016.
Jonathan Long et al., "Fully Convolutional Networks for Semantic Segmentation", In CVPR, 2015.
Joseph Redmon et al., "YOLO9000: Better, Faster, Stronger", in arXiv, 2016.
Joseph Redmon et al., "You Only Look Once: Unified, Real-Time Object Detection", In CVPR, 2016.
Kaiming He et al., "Deep Residual Learning for Image Recognition", in CVPR, 2016.
Karen Simonyan et al., "Very Deep Convolutional Networks For Large-Scale Image Recognition", arXiv:1409.155v6, Apr. 10, 2015.
Ke Li et al., "Amodal Instance Segmentation", arXiv.1604.08202v2, Aug. 17, 2016.
Liang-Cheih Chen et al., "Semantic Image Segmentation with Deep Convolutional Nets and Fully Connected CRFs", arXivc:1412.7062v3, Apr. 9, 2015.
Liang-Chieh Chen et al., "DeepLab: Semantic Image Segmentation with Deep Convolutional Nets, Atrous Convolution, and Fully Connected CRFs", arXiv.1606.00915v2, May 12, 2017.
Long Jin et al., "Object Detection Free Instance Segmention with Labeling Transformations" arXiv:1611.08991v2, Nov. 29, 2016.
Lubor Ladicky et al., "What, Where & How Many? Combining Object Detectors and CRFs", European Conference on Computer Vision, Sep. 2010.
Marius Cordts "The Cityscapes Dataset for Semantic Urban Scene Understanding", in CVPR, 2016.
Mark Everingham et al. "The PACAL Visual Object Classes (VOC) Challenge", Int J Comput Vis, 88, pp. 303-338, 2010.
Max Schwarz et al., "RGB-D Object Recognition and Pose Estimation based on Pre-trained Convolutional Neural Network Fea- (56) References Cited

OTHER PUBLICATIONS tures" 2015 IEEE International Conference on Robotics and Automation (ICRA), pp. 1329-1335, May 26, 2015.
Mengye Ren et al. "End-to-End Instance Segmentation with Recurrent Attention", In CVPR, 2016.
Moses Charikar et al., "Finding Frequent Items in Data Streams", Theoretical Computer Science, 312(1) pp. 3-15, 2014.
Philipp Krahenbuhl et al., "Efficient Inference in Fully Connected CRFs with Gaussian Edge Potentials", in NIPS 2014.
Ross Girshick et al., "Fast R-CNN", in ICCV, 2015.
Ross Girshick et al., "Rich feature hierarchies for accurate object detection and semantic segmentation" in arXiv, 2016.
Samarth Brahmbhatt et al., "StuffNet: Using 'Stuff' to Improve Object Detection", arXiv: 1610.05861v2. Jan. 30, 2017.
Saurabh Gupta et al., "Indoor Scene Understanding with RGB-D Images: Bottom-up Segmentation, Object Detection and Semantic Segmentation", Journal of Computer Vision: 112(2) pp. 133-149, Apr. 2015.
Shaoqing Ren et al., "Faster R-CNN: Towards Real-Time Object Detection with Region Proposal Networks", In NIPS, 2015.
Shuai Zheng et al., "Conditional Random Fields as Recurrent Neural Networks", in ICCV, 2015.
Spyros Gidaris et al., "Object detection via a multi-region & semantic segmentation-aware CNN model", In ICCV, 2015.
Tsung-Yi Lin et al., "Feature Pyramid Networks for Object Detection", In CVPR, 2017.
Tsung-Yi Lin et al., "Microsoft COCO: Commom Objects in Context" ECCV, Part V, LNCS 8693, pp. 740-755, 2014.
Tsung-Yu Lin et al., "Bilinear CNN Models for Fine-grained Visual Recognition", 2015.
Wei Liu et al., "SSD: Single Shot MultiBox Detector" arXiv:1512.02325v5, Dec. 29, 2016.
Xiaodan Liang et al., "Proposal-free Network for Instance-level Object Segmentation", arXiv 1509.02636, Sep. 10, 2015.
Xiaodan Liang et al., "Reversible Recursive Instance-level Object Segmentation" arXiv 1511.04517, Nov. 18, 2015.
Yang Gao et al., "Compact Bilinear Pooling" in CVPR, 2016.
Yangqing Jia et al., "Caffe: Convolutional Architecture for Fast Feature Embedding", arXiv:1408.5093v1, Jun. 20, 2014.
Yi Li et al., "Fully Convolutional Instance-aware Semantic Segmentation", In CVPR, 2017.
Yi-Ting Chen et al., "Multi-instance Object Segmentation with Occlusion Handling" In CVPR, 2015.
Zeeshan Hayder et al., "Boundary-aware Instance Segmentation" arXiv: 1612.03129v2, Apr. 7, 2017.
Zhaowei Cai et al., "A Unified Multi-scale Deep Convolutional Neural Network for Fast Object Detection", arXiv.1607.07155v1, Jul. 25, 2016.
Zifeng WU et al., "Bridging Category-level and Instance-level Semantic Image Segmentation", arXiv.1605.06885v1, May 23, 2016.
Ziwel Liu et al., "Semantic Image Segmentation via Deep Parsing Network", arXiv:1509.02634v2, Sep. 24, 2015.
Ziyu Zhang et al., "Instance-Level Segmentation for Autonomous Driving with Deep Densely Connected MRFs", in CVPR, 2016.

\* cited by examiner

SYSTEMS FOR PERFORMING SEMANTIC SEGMENTATION AND METHODS THEREOF

CLAIM OF PRIORITY UNDER 35 U.S.C. § 119

The present application for patent claims priority to Provisional Application No. 62/467,642, entitled "SYSTEMS FOR PERFORMING SEMANTIC SEGMENTATION AND METHODS THEREOF" filed Mar. 6, 2017, which is hereby expressly incorporated by reference herein for all purposes.

BACKGROUND

Category-level and instance-level semantic segmentation are two fundamental computer vision tasks for scene understanding (e.g., determining properties of one or more objects in a scene represented in an image). Category-level semantic segmentation aims to assign a label for each pixel, which may be indicative of an object type or category. Instance-level semantic segmentation aims to localize and recognize objects using masks. A similar task to instance-level semantic segmentation is object detection, which uses bounding boxes instead of masks to localize objects. These tasks are performed independently to provide respective category and instance information for the image. Recent progress in category-level and instance-level semantic segmentation has made tremendous improvements due to the success of deep convolutional neural networks. On the other hand, instance-level semantic segmentation has recently become a core challenge in scene understanding.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method for performing semantic segmentation of an image is provided. The method includes processing the image using a plurality of convolutional layers to generate one or more feature maps, providing at least one of the one or more feature maps to multiple segmentation branches, and generating segmentations of the image based on the multiple segmentation branches, including providing feedback to, or generating feedback from, at least one of the multiple segmentation branches in performing segmentation in another of the multiple segmentation branches.

In another example, a computing device for generating a semantic segmentation of an image is provided, including a memory, and at least one processor coupled to the memory. The at least one processor is configured to process the image using a plurality of convolutional layers to generate one or more feature maps, provide at least one of the one or more feature maps to multiple segmentation branches, and generate segmentations of the image based on the multiple segmentation branches, including providing feedback to, or generating feedback from, at least one of the multiple segmentation branches in performing segmentation in another of the multiple segmentation branches.

In another example, a non-transitory computer-readable medium storing computer executable code for generating a semantic segmentation of an image is provided. The code includes code for processing the image using a plurality of convolutional layers to generate one or more feature maps, providing at least one of the one or more feature maps to multiple segmentation branches, and generating segmentations of the image based on the multiple segmentation branches, including providing feedback to, or generating feedback from, at least one of the multiple segmentation branches in performing segmentation in another of the multiple segmentation branches.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The patent or application file contains at least one drawing executed in color. Copies of this patent application pulbication with color drawing(s) will be provided by the Office upon request and payment of the necessary fee. The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are aspects related to jointly performing category-level semantic segmentation and instance-level semantic segmentation of images such that features of the category-level semantic segmentation can be used in performing the instance-level semantic segmentation, and/or vice versa. For example, a fully convolutional network can be trained with feature maps generated from both category-level semantic segmentation and instance-level semantic segmentation (e.g., and/or other types of segmentation), and the fully convolutional network can be used in performing segmentation of other images such to detect categories associated with pixels in the image, generate masks of instances of objects in the image, etc. As described above, and further herein, category-level semantic segmentation can relate to a process for analyzing pixels in an image and assigning a label for each pixel, where the label may be indicative of an object type or category.

For example, in category-level semantic segmentation, collections of pixels in the image can be compared to feature maps corresponding to the object types or categories to detect collections of pixels in the image that likely correspond to the object types or categories. The associated pixels can be accordingly labeled based on the detected object type/category. For example, in instance-level semantic segmentation, region proposals for proposed objects can be localized from the image, and recognition can be performed for the region proposals using instance masks related to known or otherwise determined object instances. Regions that are recognized can be associated as an instance.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate S DRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1:
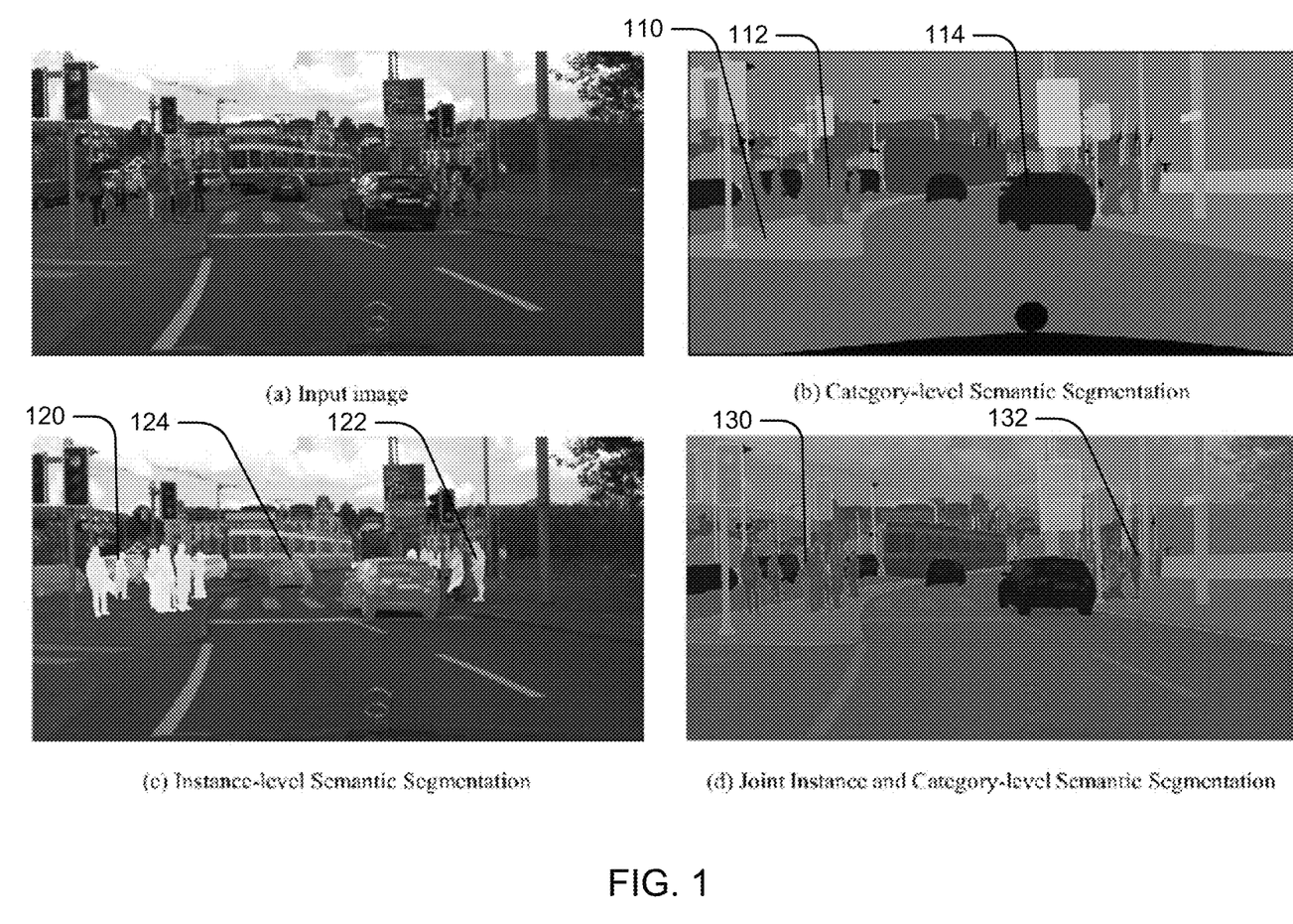
FIG. 1 illustrates examples of images and semantic segmentations according to one aspect of the disclosure.

FIG. 1 illustrates examples of images and semantic segmentations according to one aspect of the disclosure. Given an image in (a), a ground truth of category-level semantic segmentation is shown in (b), where each pixel is labeled with its corresponding category, which is represented by reference numerals 110 for sidewalk pixels, 112 for pedestrian pixels, 114 for automobile pixels, etc. in the representation of the image shown in (b). In FIG. 1, an example of instance-level semantic segmentation ground truth is shown in (c), where each object in the image is localized based on one or more masks, and are shown as represented using reference numerals 120 and 122 for different instances of pedestrians, 124 for an instance of an automobile, etc., to denote the segmentation of the objects (or instances). In FIG. 1, the expected output of joint category-level and instance-level semantic segmentation, as described herein, is shown in (d). In (d), instances of traffic participants (e.g., cars, pedestrians and riders) are localized using masks, and categorized using category-level semantic segmentation, which can be denoted using different colors in the segmentation for categories with each instance being separately outlined, but are shown here in black and white). For example, different instances of pedestrian shown at 130 and 132 can be of the same color to represent the same category (though shown here in black and white), but be separately outlined in a mask or box to represent the instance. The rest of objects without the instance concept (e.g., road area, sidewalk and sky, which are not segmented using instance-level semantic segmentation) are denoted with their corresponding categories (e.g., using different colors in the representation of the image, but shown in black and white in (d)).

Conventionally, category-level semantic segmentation and instance-level semantic segmentation are independently performed. In some systems, a Conditional Random Field (CRF) framework with a higher order potential can be used to link the network of category-level semantic segmentation and object detection to determine instance-level semantic segmentation. On the other hand, some systems apply a Hough-like transform to bridge the network of category-level semantic segmentation and object detection to generate instances. In both cases, object detection is utilized as the main component to obtain instances, but are typically used in, or performed by, a different module than the semantic segmentation. In some systems, object detection and category-level semantic segmentation can be integrated by using hand-crafted features, and integrating the two tasks using CRF and a consistency component, where the consistency component can enforce the correlations between object detection and category-level semantic segmentation, respectively. Also, different architectures within deep neural networks can be used based on incorporating the features of the semantic segmentation sub-network to the object detection sub-network, which can lead to improvements on the object detection task, but may have limited performance gain in the category-level semantic segmentation. Other systems may use a higher order potential based on object detections, which is used in a CRF framework, and the parameters in the new CRF framework can be trained end-to-end within a deep neural network. This can result in improvement of category-level semantic segmentation.

In an example, as described herein, a fully convolutional network can be jointly trained (e.g., as a unified system) based on multiple segmentation branches, which can provide more desirable detection results for each of the segmentation branches. For example, a unified framework can be used to jointly perform category-level segmentation and instance-level segmentation, and the framework can be trained end-to-end. Specifically, a fully convolutional network can be provided that produces shared features for both segmentation tasks. Then, the shared features can be sent to, or otherwise used by, different sub-networks to obtain instance-level and category-level semantic segmentation, respectively.

Moreover, a specific feedback mechanism can be provided for each sub-network to incorporate its features to another sub-network in training the fully convolutional network. The feedback mechanism can leverage a pooling operation (e.g., multimodal compact bilinear pooling) to improve classification of instance masks, which can include modifying multimodal features from vision and language to object detection and category-level semantic segmentation. The feedback mechanism can also include a CRF framework that receives sematic instance masks as input to improve quality of category-level semantic segmentation. In this regard, at least these two types of segmentation can be jointly improved to result in improved segmentation of images based on the fully convolutional network.

Category-Level Semantic Segmentation

Some category-level semantic segmentation systems are based on deep neural networks and can be divided into multiple categories. In one category, the task can be treated as a pixel-level classification problem. Specifically, the fully-connected layers in a deep convolutional neural network for classification can be replaced with the customized convolution layers such that the network can output pixel-level semantic segmentation, and each pixel is the probability of each predefined category. In another category, structure prediction, e.g., CRF, can be used to take predictions from the last layer of convolutional net for further segmentation refinement.

In one example, Deeplab, as proposed in "Semantic Image Segmentation with. Deep Convolutional Nets and Fully Connected CRFs" by L. C. Chen et al. (presented at International Conference on Learning Representations (ICLR) 2015), the entirety of which is incorporated by reference herein, can be used for a category-level semantic segmentation sub-network for determining object types or categories corresponding to collections of pixels. As discussed, output from an instance-level semantic segmentation sub-network can be input into a proposed CRF framework, which can take a pixel-wise prediction from a CRF layer (e.g., a last layer in Deeplab) and semantic instance masks from the instance-level semantic segmentation output to form a unary term. To take the features from the instance-level semantic segmentation sub-network, the proposal in "Higher Order Conditional Random Fields in Deep Neural Networks" by A. Arnab et al. (presented at European Conference on Computer Vision (ECCV) 2016), the entirety of which is incorporated by reference herein, can be used to incorporate a higher order potential to the CRF framework, which can be used in Deeplab. A higher order potential has shown its effectiveness in segmentation refinement. A. Arnab et al. propose two customized higher order potentials based on object detections and superpixels that allow CRF to perform inference within a convolutional neural network (CNN) framework that the filters' weights and CRF parameters can be trained jointly. In this framework, object detections can be further processed to generate masks. However, the masks are not optimized. Furthermore, the object detection branch in is trained separately. As described in examples herein, masks directly from the instance-level semantic segmentation branch can be utilized directly, and the masks can be optimized jointly in the unified framework.

Object Detection

Object detection is similar to instance-level semantic segmentation, but instead uses bounding boxes to localize objects whereas instance-level semantic segmentation describes objects with masks. With the advance of the recent deep neural architectures deep neural based objection algorithms have made improvement over conventional detectors. In one system, regions with CNN (R-CNN) can be a first deep learning based object detector, and can extract deep learned features for region proposals. The features can be fed to support vector machine (SVM) to train the object detector. A fast R-CNN architecture can be used, which integrates the feature extractor and classifier into a unified network. Another faster R-CNN can be used, which incorporates a Region Proposal Network (RPN) and fast R-CNN into an end-to-end trainable framework. Most, if not all, recent object detectors follow the two stage design pattern that consists of region proposal networks, and region proposal classifier.

In examples described herein, R-FCN can be used for instance-level semantic segmentation. In terms of the feedback mechanism, the features extracted in the category-level semantic segmentation sub-network can be integrated to the R-FCN's region classification sub-network. Category-level semantic segmentation can boost the performance of object detection as category-level semantic segmentation provides context cues to object detectors.

Instance-Level Semantic Segmentation

Instance-level semantic segmentation can be obtained based on object detection. Some systems are based on object detection without using region proposals. In examples described herein, the instance mask generation strategy proposed in "Instance-aware Semantic Segmentation via Multi-Task Network Cascades (MNC)" by J. Dai et al. (presented at Computer Vision and Pattern Recognition (CVPR) 2016), the entirety of which is incorporated by reference herein, which uses regression to generate finer bounding boxes for instances or instance segmentation masks from region proposals, can be used for instance-level semantic segmentation. Regarding the object recognition in MNC, features can be extracted from region proposals and the features extracted from segmentation masks can be incorporated to boost the recognition performance, which is similar to simultaneous detection and segmentation (SDS), as proposed in "Simultaneous Detection and Segmentation" by B. Hariharan et al. (presented at ECCV 2014), the entirety of which is incorporated by reference herein. However, in examples described herein, an R-FCN classifier, such as that proposed in "R-FCN: Object Detection via Region-based Fully Convolutional Network" by J. Dai (presented at Neural Information. Processing Systems (NIPS) 2016), the entirety of which is incorporated by reference herein, may be used. Furthermore, the classifier can incorporate the features from the category-level semantic segmentation, which includes context information. For example, this may be achieved based on combining feature maps by using a fusing operation (e.g., a compact bilinear pooling or other pooling operation, CRF, etc.) to incorporate the category-level semantic features. By this setting, the classification performance can be boosted.

Joint Category-Level and Instance-Level Semantic Segmentation

Figure 2:
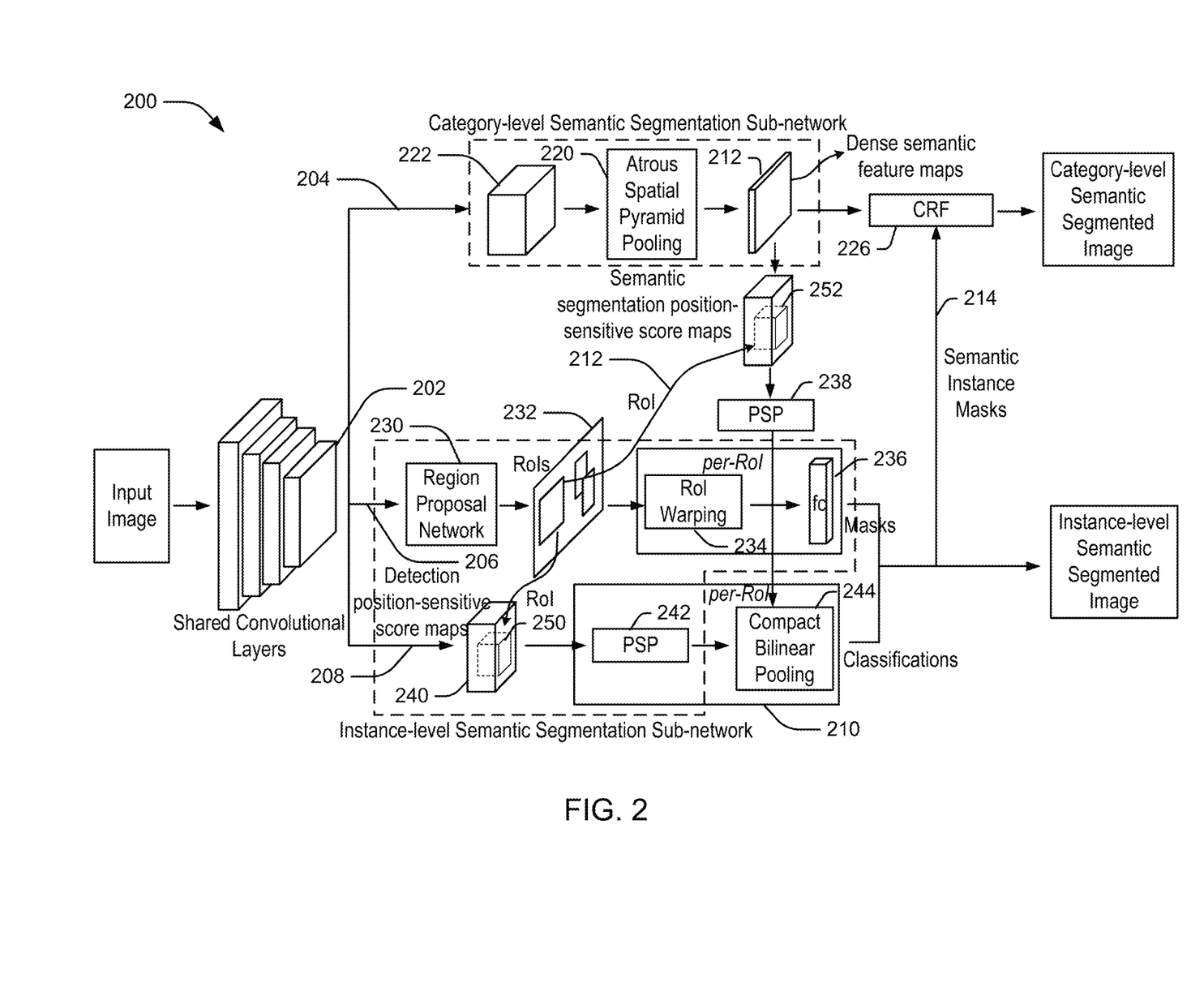
FIG. 2 illustrates a schematic view of an example of a process for generating a semantic segmentation of an image according to one aspect of the disclosure.

FIG. 2 illustrates an example of a framework 200 for providing a joint category-level and instance-level semantic segmentation algorithm. The framework includes a two-branch network, which can simultaneously (e.g., concurrently) perform instance-level and category-level semantic segmentation of an image or a portion thereof based on corresponding sub-networks of a fully convolutional network. The instance-level branch 206 and/or 208 can be based on R-FCN (e.g., as used in MNC or otherwise), and may include modifications to generate masks instead of bounding boxes. The category-level branch 204 can be based on Deep Lab and/or a higher order CRF framework embedded in deep neural networks. Furthermore, a feedback mechanism can be employed to incorporate the feature maps of one sub-network to another sub-network. This feedback mechanism can allow for the capability of jointly boosting the two segmentation tasks.

In an example, the backbone of the sub-networks (e.g., the sub-network for category-level semantic segmentation, the sub-network for instance-level semantic segmentation, and/or other sub-networks of the fully convolutional network) can use ResNet-101, as proposed in "Deep Residual Learning for Image Recognition" by K. He et al. (as presented at CVPR 2016), the entirety of which is incorporated by reference herein. ResNet-101 has 100 convolutional layers, and a global average pooling and 1000-class fully connected layer, which are concatenated after the convolutional layers. The network is designed for ImageNet classification challenge, as described in "A Large-Scale Hierarchical Image Database" by J. Deng et al. (as presented in CVPR 2009), the entirety of which is incorporated by reference herein. In the examples provided herein, the average pooling layer and the fully connected layer in ResNet-101 can be removed from the pipeline, and the convolutional layers can remain in the proposed network. The feature maps of the last convolutional layer, e.g., conv4_22 in ResNet-101 (e.g., layer 202 in FIG. 2), can be shared with the sub-networks of the branches 204, 206, 208 as shown in FIG. 2. The weights in the shared convolutional layers can be pre-trained on ImageNet and/or fine-tuned using another operation, such as Microsoft Common Objects in Context (MS-COCO), as proposed in "Microsoft COCO: Common Objects in Context" by T.-Y. Lin, et al (as presented in ECCV 2014), the entirety of which is incorporated by reference herein. A pre-trained model can be used in some example, such as the model described by K. He et al. The filters' weights of the two sub-networks can be initialized from. Gaussian with standard deviation 0.01.

In the category-level semantic segmentation sub-network, Deeplab can be used, as described, for obtaining convolutional layers. In this example, due to max-pooling layers and sub-sampling processes in the convolutional layers, the resolution of feature maps from the last layer (e.g., layer 202) can be much lower than the input image. In this regard, for example, the category-level semantic segmentation can use an Atrous Spatial Pyramid Pooling (ASPP) layer 220 to exploit multiscale features and improve performance of the segmentation. For example, atrous convolution via the ASPP layer 220 can introduce r−1 zeros between two filter values with a rate r, which can enlarge an effective field of view for the operation while maintaining the same number of filter values. This allows for using different rates in generating the convolution layers (e.g., via. Deeplab) to exploit multiscale features maps that can be fused to generate the output. For example, a convolutional layer 222 generated from layer 202 can be input into the ASPP layer 220 to generate one or more dense semantic feature maps 212. Along with being used as input for a higher-order CRF framework 226 for generating category-level semantic segmentation for the image, the dense semantic feature maps 212 can also be provided as feedback to the instance-level semantic segmentation or associated sub-network, as shown.

In the instance-level semantic segmentation sub-network, technologies such as R-FCN, MNC (e.g., or ROI-warping from MNC, as described herein), and/or the like, can be used, as described, for region proposals, to generate the instance masks, etc. For example, region proposals (e.g., regions of interest (RoI) 232) for the layer 202 can be generated from RPN 230, and a customized RoI classifier 210 is provided to classify the region proposals. In an example, a last layer 240 of the convolutional blocks (e.g., conv5, which may include 2048 channels in an example) can be convolved with a 1×1 convolutional layer to generate a feature map (e.g., a 1024-channel feature map). Then, $k^2$ (C+1) channels feature maps, also referred to as detection position-sensitive score maps 250, can be generated, where the +1 can be for the background class and a total of C categories. The $k^2$ can correspond to a k×k spatial grid, where the cell in the grid encodes the relative positions (e.g., top-left and bottom-right). In one example, k can be set to 7. In an example, the detection position-sensitive score maps can be generated for each RoI 232 in the image provided as output from the RPN 230. A pooling operation (e.g., position sensitive pooling 242) can be applied to the detection position-sensitive score maps to obtain a C+1-dimensional vector for each RoI 232.

In addition, the RPN 230 and RoI classifier 210 can share the feature maps from the convolutional layers. The RoIs 232 can be sent to a RoI warping layer 234 for the instance mask generation, which can be based on MNC, which can include transforming each RoI 232 into a fixed resolution. A max pooling operation can be applied to the warped RoI, and two additionally fully-connected (fc) layers 236 can be concatenated after the max pooling. This fc layer 236 regresses a pixel-wise mask given a RoI 232, and can be output to generate the instance-level semantic segmentation masks 214 of the image. In addition, the classification of each instance mask is determined by the RoI classifier 210. To further boost the performance of the ROI classifier 210, the feature maps 212 can be stacked into the layers of RoI classifier 210, which may include stacking the feature maps 212 using a pooling operation (e.g., a position sensitive pooling (PSP) 238, a compact bilinear pooling 244 or other pooling or fusion operation, etc.). For the higher order potential term in the category-level semantic segmentation, the learned classified instance masks 214 can be provided as feedback and incorporated, e.g., instead of the masks generated by using Grabcut from object detections, as these masks may not be optimized.

As depicted in FIG. 2, for example, from the instance-level segmentation sub-network, the learned classified instance masks 214 can be provided as an input to the higher-order CRF framework 226. Additionally, for example, the feature maps 212 extracted from the last layer of the category-level semantic segmentation sub-network can be provided to the RoI classifier 210, as described further herein. The overall framework can be trained end-to-end so that the performance of category-level and instance-level segmentation can be improved.

In an example, feedback can be provided to the instance-level segmentation sub-network in the form of the feature maps 212. In an example, these feature maps 212 and the feature maps generated in the RoI classifier 210 can be fused by using compact bilinear pooling (CBP) 244. For example, the feature maps 212, denoted $f_D$, and the feature maps generated by the RoI classifier, denoted $f_S$, can be combined at each location l on the feature map using a matrix outer product, e.g., bilinear (l, $f_D$, $f_S$)=$f_D(l)^T f_S(l)$. The output bilinear feature can be sum pooled by summing values at all locations, e.g., $\phi=\Sigma_l$ bilinear (l, $f_D$, $f_S$), where $\phi$ is the final feature vector used for classification. The CBP can reduce the dimension of $f_D$ and $f_S$. The feature maps 212 can be convolved to generate semantic segmentation position sensitive score maps 252 to make the feature dimension the same as detection position sensitive score maps 250. PSP layers 242 and 238 can take the detection position sensitive score maps 250 and the semantic segmentation position sensitive score maps 252, respectively (and/or may be the same PSP layer) to generate two position-sensitive pooled feature maps. The number of classes used in the category-level semantic segmentation and instance-level semantic segmentation may be different, and thus the number of classes in the two position-sensitive pooled feature maps can be different. In this regard, an average pooling can be performed to the non-instance segmentation classes with the background class to result in a single background class (or other lesser number of background classes). This can result in the same number of classes in the two position-sensitive pooled feature maps for category-level and instance-level semantic segmentation (e.g., to be used by the CBP layer 244).

In another example, feedback can be provided to the category-level segmentation sub-network in the form of the semantic instance masks 214. In an example, the semantic instance masks 214 can be incorporated into the CRF framework 226 along with the dense semantic feature maps 212 generated from the category-level semantic segmentation. In one example, the CRF framework 226 can be extended from Dense CRF described in L. C. Chen et al. In performing the category-level semantic segmentation based on the instance-level semantic segmentation feedback, given an image, I, a label can be assigned to a pixel, i, of the image I where the label can be from a set of labels $\mathcal{L}=\{l_1, l_2, \ldots, l_L\}$. Given a set of random variables, X, where $X=\{X_1, X_2, \ldots, X_N\}$, where N is the number of pixels, and given a graph $\mathcal{G}=(\mathcal{V}, \mathcal{E})$, where vertices $\mathcal{V}$ represent a set of random variables X, and edges $\mathcal{E}$ denote connections among the vertices, the pair of (I, X) can be characterized as a CRF by $$P(X = x \| I) = \frac{1}{Z(I)}(\exp(-E(x \| I))),$$

where Z(I) is the normalization factor and E(•) is the energy function.

Using this framework, and ignoring I for convenience of notation, the energy of the assignment x can be denoted:

$$E(x) = \sum_i \psi_u(x_i) + \sum_{i<j} \psi_p(x_i, x_j)$$

where $\psi_u(\bullet)$ is the unary term and $\psi_p(\bullet,\bullet)$ is the fully-connected pairwise term. As in L.C. Chen et al., the fully-connected pairwise term can be defined as weighted Gaussian:

$$\psi_p(x_i, x_j) = \mu(x_i, x_j) \sum_{k=1}^{K} \omega^{(k)} k_G^{(k)}(f_i, f_j)$$

where $k_G^{(k)}(\bullet,\bullet)$ is the Gaussian kernel, and there are totally K kernels, the parameter $f_i$ and $f_j$ are features derived from the input image I, the function $\mu(\bullet,\bullet)$ is the compatibility function, where $\mu(x_i, x_j)=1$ if $x_i \neq x_j$ and zero otherwise. In an example, the weighted Gaussian kernel can be formulated as:

$$\sum_{k=1}^{K} \omega^{(k)} k_G^{(k)}(f_i, f_j) = \omega^{(1)} \exp\left(-\frac{|i-j|^2}{2\theta_\alpha^2} - \frac{|I_i - J_j|^2}{2\theta_\beta^2}\right) + \omega^{(2)} \exp\left(-\frac{|i-j|^2}{2\theta_\gamma^2}\right)$$

where $\theta_\alpha$, $\theta_\beta$, and $\theta_\gamma$ control the scale of the Gaussian kernels. The first Gaussian kernel can represent the appearance term providing a constraint that nearby pixels with similar color can be in the same class. On the other hand, the second term can aim to minimize small isolated regions to maintain spatial smoothness. The above CRF, which can be used as part of CRF framework 226, can be approximated using a mean field approximation as the exact inference may not be tractable. A mean field inference can approximate the CRF distribution P(X) by a distribution Q(X) that minimizes the KL-divergence D(Q‖P) where Q(X) can be expressed as $Q(X)=\Pi_i Q_i(X_i)$.

In Deeplab, the unary term can be obtained from a CNN that provides a rough prediction of the pixel's label. The pairwise term can enforce a smoothness and consistency between the label assignment of each pixel. Aside from the two potentials, an instance term can be introduced as well. Assuming M semantic instance masks 214, the $m^{th}$ mask can have the form ($l_m$, $s_m$, $F_m$) where $l_m \in \mathcal{L}$ can be the class label, $s_m \in [0,1]$ can be the score of the instance mask, and $F_m$ can be the set of indices of the pixels belonging to the mask. The proposed unary term can be defined as:

$$\psi_u(x_i) = -\ln(P_{CNN}(x_i) + \omega_1 P_{instance}(x_i))$$

where $P_{CNN}$ is the probability prediction of the labels for pixels, and the instance term $P_{instance}$ is formulated as:

$$P_{instance}(X_i = l_m) = \begin{cases} P_{CNN}(x_i = l_m) s_m & \text{if } i \in F_m \\ 0 & \text{otherwise} \end{cases}$$

The parameter $P_{CNN}(x_i=l_m)$ can be the probability of the pixel's semantic being the class $l_m$, which can be the same as the semantic instance mask. The parameter $\omega^{(2)}$ can be determined empirically.

Figure 3:
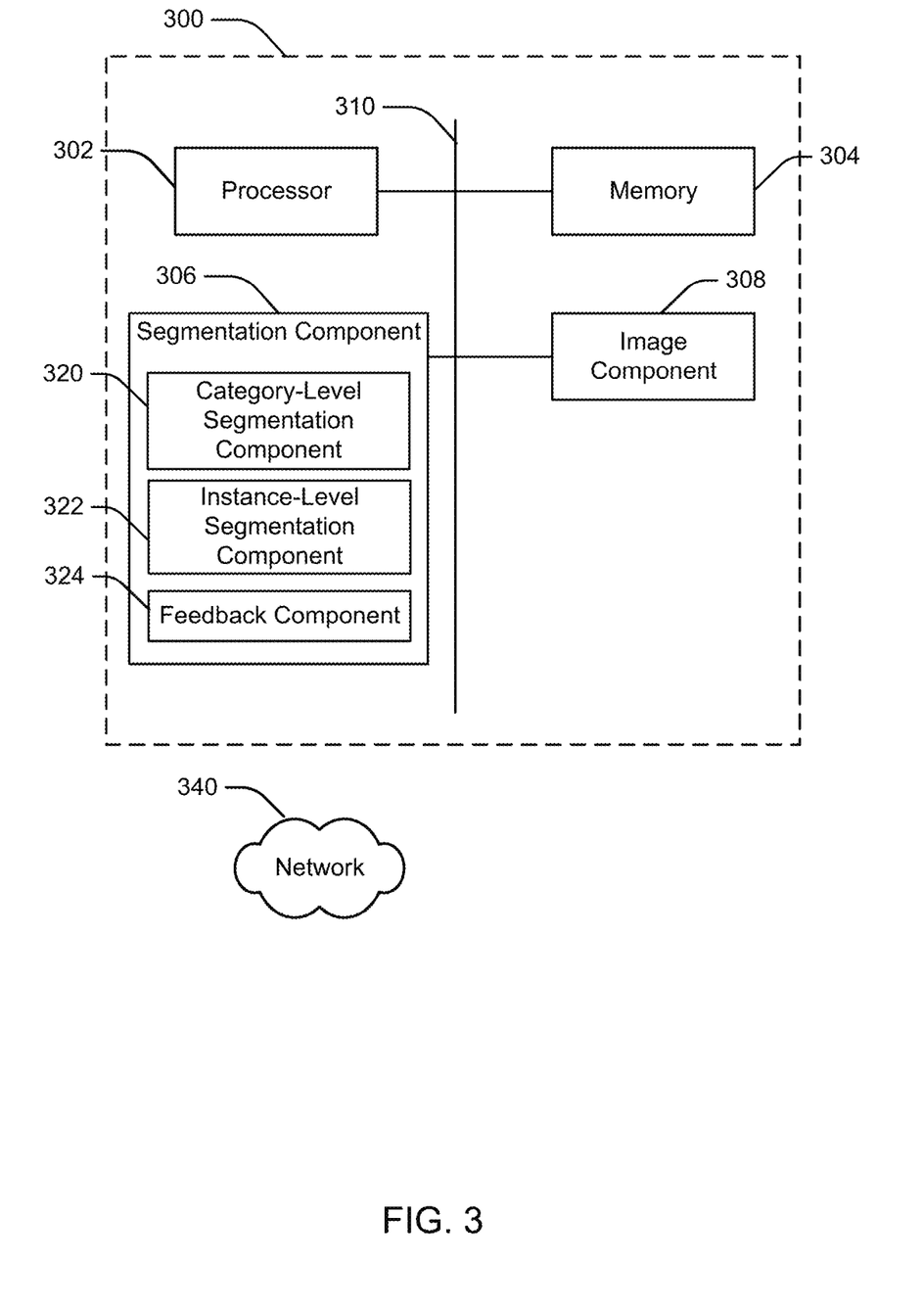
FIG. 3 illustrates a schematic view of an example of a system for generating a semantic segmentation of an image according to one aspect of the disclosure.

FIG. 3 shows a schematic view of an example of a system 300 for performing segmentation of objects in an image in accordance with aspects described herein. Components of the system 300, as well as the components of other systems, hardware architectures and software architectures discussed herein, can be combined, omitted or organized into different architectures for various aspects of the disclosure. However, the example aspects and configurations discussed herein focus on the system 300 as illustrated in FIG. 3, with corresponding system components and related methods.

As shown in FIG. 3, system 300 can include or be operably coupled with (or executed by) one or more processors 302 and one or more memories 304 that communicate to effectuate certain actions described herein. For example, the one or more processors 302 and/or one or more memories 304 may execute, and/or store instructions, parameters, etc., for executing, a segmentation component 306 for providing joint category-level and instance-level semantic segmentation of an image received from an image component 308 (e.g., from a camera, from an interface to memory 304, etc.), as described herein. The processor(s) 302, memory(ies) 304, various ones of the components 306, 308, etc. may be operatively coupled via a bus 310. In another example, processor(s) 302 may execute one or more of the various components 306, 308 to perform functions described herein, while being operatively coupled to the memory(ies) 304 and/or other components via the bus 310.

In an example, segmentation component 306 may include a category-level segmentation component 320 for providing a category-level semantic segmentation of an image, and an instance-level segmentation component 322 for providing an instance-level semantic segmentation of the image. Segmentation component 306 can also include a feedback component 324 for providing feedback of the category-level semantic segmentation to the instance-level segmentation component 322, providing feedback of the instance-level semantic segmentation to the category-level segmentation component 320, etc.

Figure 4:
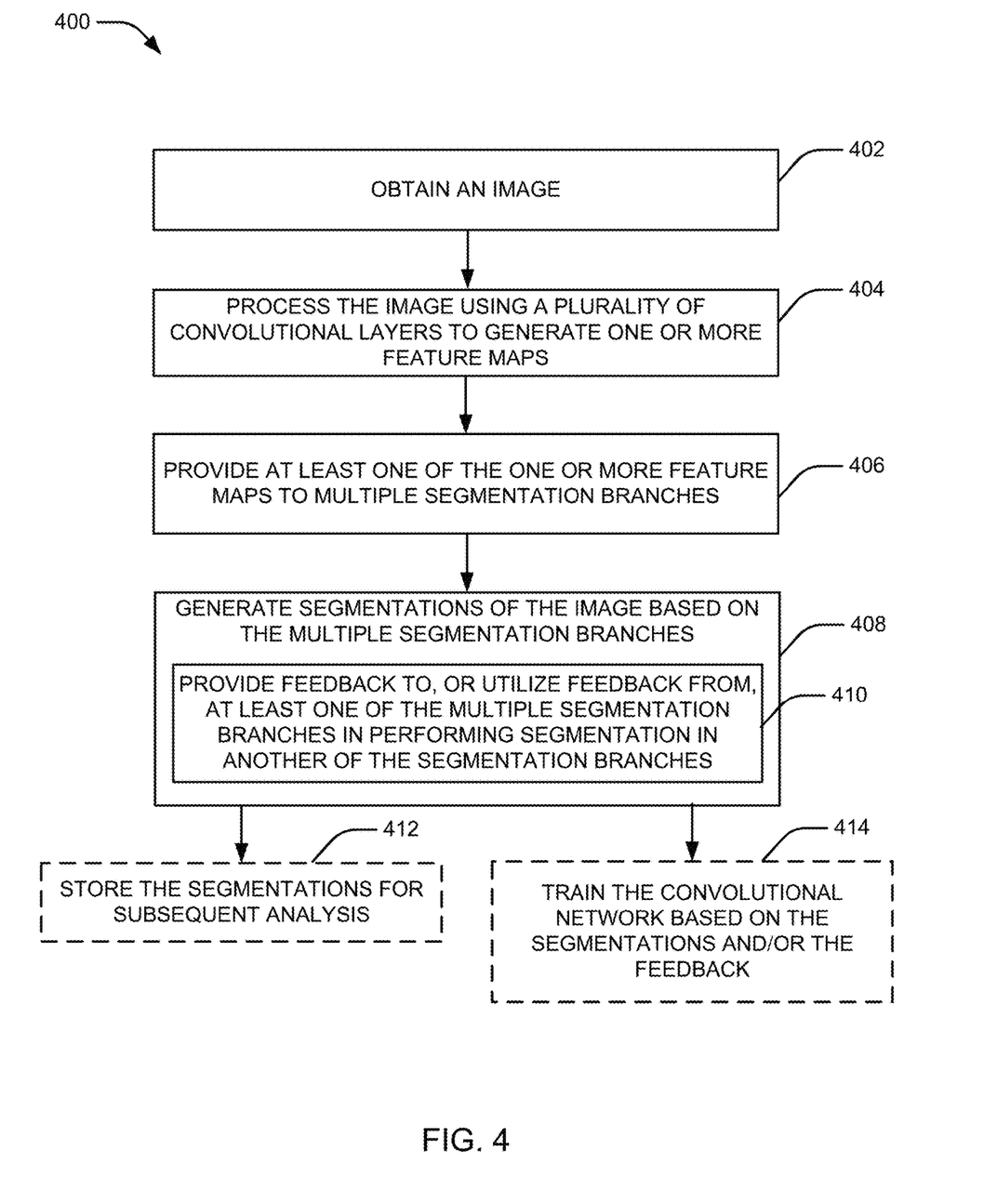
FIG. 4 illustrates a flowchart showing an example of a method for generating a semantic segmentation of an image according to one aspect of the disclosure.

Referring now to FIG. 4, which is described in conjunction with the example system 300 of FIG. 3, an example method 400 for generating semantic segmentations of an image is illustrated. For example, method 400 may be performed by one or more processors 302 and/or memories 304 of a system 300, which may be a single computing device, distributed across multiple computing devices, etc. In this regard, one or more blocks may be performed (e.g., in full or in part) on a given computing device, on a device at a remote location (e.g., such that results can be shared with the given computing device), etc.

In block 402, the method 400 can include obtaining an image. In an aspect, image component 108 can obtain the image. For example, image component 108 can obtain the image from a camera on the system 300, from memory 304, from a remotely located system, etc. The image can include multiple objects that may be detected and/or categorized, as described herein, such to label corresponding pixels with an object/class or category, associated a collection of pixels with an instance mask, etc.

In block 404, the method 400 can include processing the image using a plurality of convolutional layers to generate one or more feature maps. In an aspect, segmentation component 306, e.g., in conjunction with processor 302, memory 304, etc., can process the image using the plurality of convolutional layers to generate the one or more feature maps. For example, as described, segmentation component 306 can apply the plurality of convolutional layers to the image, such as conv1, conv2, conv3, conv4, etc. to arrive at a layer 202 for providing to one or more segmentation branches for generating the one or more feature maps, such as feature maps 212 and/or feature maps generated in the RoI classifier 210.

In block 406, the method 400 can include providing at least one of the one or more feature maps to multiple segmentation branches. In an aspect, segmentation component 306, e.g., in conjunction with processor 302, memory 304, etc., can provide at least one of the one or more feature maps to the multiple segmentation branches. For example, segmentation component 306 can provide feature maps to a category-level semantic segmentation branch (e.g., as shown at 204 in FIG. 2), as well as to an instance-level semantic segmentation branch (as shown at 206, 208 in FIG. 2).

In block 408, the method 400 can include generating segmentations of the image based on the multiple segmentation branches. In an aspect, category-level segmentation component 320 and/or instance-level segmentation component 322, e.g., in conjunction with processor 302, memory 304, etc., can generate semantic segmentations of the image based on the multiple segmentation branches. For example, category-level segmentation component 320 can process the image based on additional convolutional layers 222, an ASPP layer 220, etc., to generate additional feature maps 212, and can perform higher-order CRF framework 226 to generate a category-level semantic segmentation of the image, as shown in FIG. 2 (and in the example of FIG. 1(b)), and as described above. In another example, instance-level segmentation component 322 can utilize an RPN 230 to determine RoIs 232 of the received feature maps, and can generate an instance mask by processing through fully connected (fc) layers 236, as described above. The category of each RoI/instance mask can be determined by RoI classifier, shown at 210. Instance-level segmentation component 322 can be used to generate semantic instance masks 214 for the image, as shown in FIG. 2 (and in the example of FIG. 1(c)).

In generating the segmentations at block 408, method 400 can also include, at block 410, providing feedback to, or utilizing feedback from, at least one of the multiple segmentation branches in performing segmentation in another of the segmentation branches. In an aspect, category-level segmentation component 320 and/or instance-level segmentation component 322, e.g., in conjunction with processor 302, memory 304, etc., can provide feedback to, or utilize feedback from, at least one of the multiple segmentation branches in performing segmentation in another of the segmentation branches. In this regard, for example, each of the multiple segmentation branches correspond to a different type of segmentation (e.g., one segmentation branch can correspond to category-level segmentation, another segmentation branch can correspond to instance-level segmentation, etc.).

For example, category-level segmentation component 320 may provide feature maps (e.g., dense semantic feature maps 212) to the instance-level segmentation component 322 (e.g., as shown in FIG. 2 as providing the dense semantic feature maps 212 to generate semantic segmentation position-sensitive score maps 252, which are provided to a PSP layer 238 and to the RoI classifier 210 (e.g., to the CBP layer 244) for determining classifications associated with determined RoIs 232). As described previously, this allows the instance-level segmentation component 322 to utilize the scores maps in determining an instance of a detected RoI (e.g., in performing RoI warping 234), categorizing the detected RoI, etc., as described.

Similarly, for example, instance-level segmentation component 322 may provide feature maps (e.g., as generated using the full connected (fc) layers 236, and/or including masks related to detected RoIs) to the category-level segmentation component 320 (e.g., including semantic instance masks 214 in FIG. 2). This allows the instance-level segmentation component 322 to utilize the masks in determining a category of a detected object (e.g., at a higher-order CRF framework 226), as described.

For example, the generated semantic segmentations can be stored in memory 304, provided to one or more other systems, utilized in performing one or more other processes that can determine additional information based on the indicated instance and/or category of one or more objects in the image, etc. In one example, a combined category-level and instance-level semantic segmentation can be created, such as the segmentation shown in FIG. 1(d), by combining information from the segmentations, using feedback from one semantic segmentation in generating the other segmentation, etc. In addition, for example, the method 400 can be performed, e.g., by framework 200, system 300, etc., in generating and/or training one or more portions of the fully convolutional network, such as the category-level semantic segmentation sub-network, the instance-level semantic segmentation sub-network, etc. The trained portions of the fully convolutional network can then be used by the corresponding segmentation branches to segment an input image in providing a category-level semantic segmentation image, the instance-level semantic segmentation image, a combined category-level and instance-level semantic segmentation image, etc., as shown in FIG. 1.

In this regard, method 400 may optionally include, at block 412, storing the segmentations for subsequent analysis. In an aspect, segmentation component 306, e.g., in conjunction with processor 302, memory 304, etc., can store the segmentations (e.g., in memory 304) for subsequent analysis. For example, the subsequent analysis may relate to identifying the instances and categories of objects in the image such to determine parameters for operating a vehicle in view of the detected objects. In another example, the subsequent analysis may relate to identifying the instances and categories of objects in the image such to determine parameters for a robotic application. For example, a robot can use the analysis to understand an indoor or outdoor scene. The computer on the robot can segment an image into wall, ground, ceiling, etc., using category-level semantic segmentation. Then, the computer can parse objects using instance-level semantic segmentation. A joint framework can achieve better segmentation quality, as described above.

Moreover, for example, method 400 may optionally include, at block 414, training the convolutional network based on the segmentations and/or the feedback. In an aspect, segmentation component 306, e.g., in conjunction with processor 302, memory 304, etc., can train the convolutional network based on the segmentations and/or the feedback. As described, segmentation component 306 can incorporate the feature maps 212, instance masks 214, etc. into the fully convolutional network to provide additional comparisons for determining categories and/or identifiable regions of input images.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 500 is shown in FIG. 5.

Figure 5:
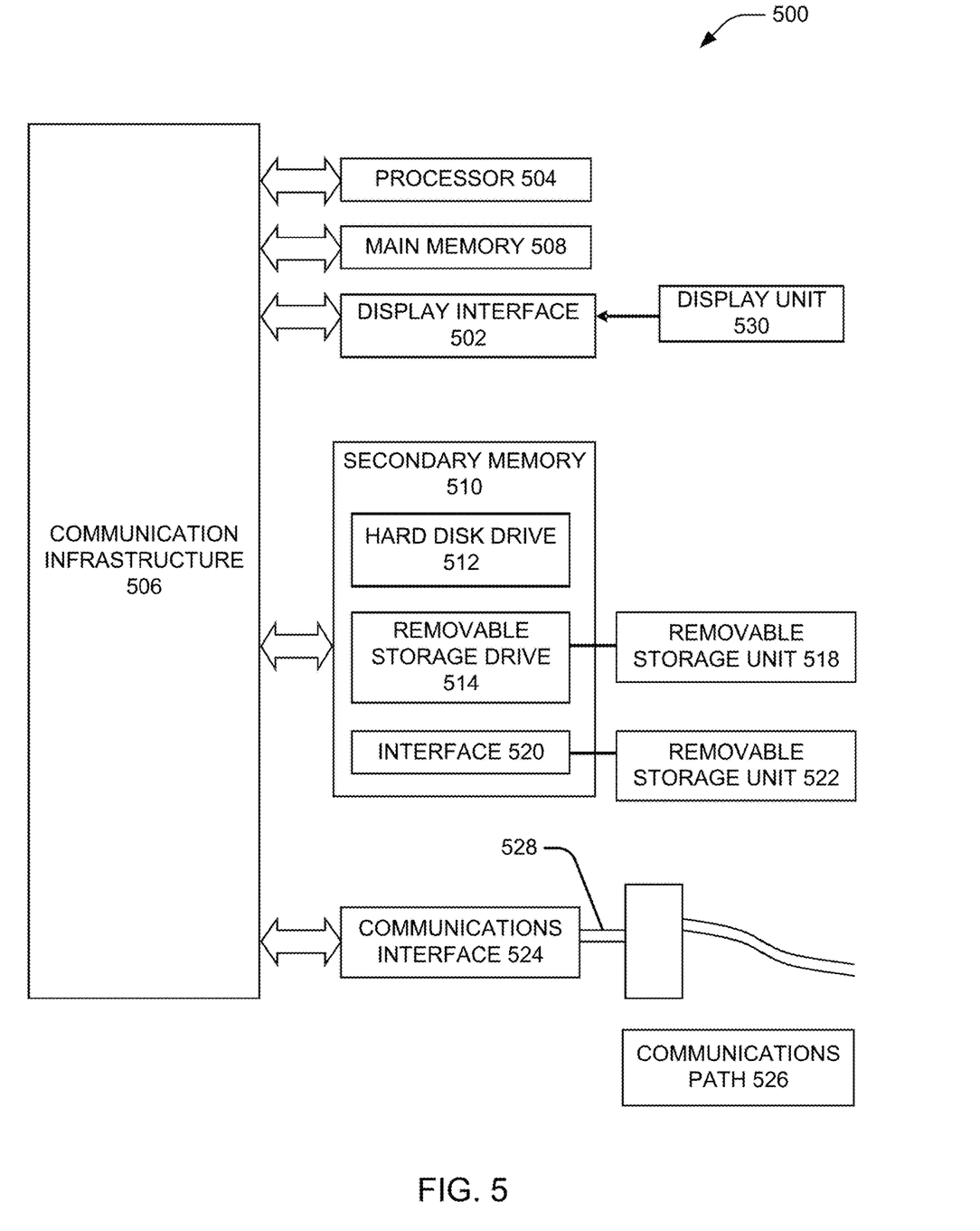
FIG. 5 presents an example system diagram of various hardware components and other features according to one aspect of the disclosure.

FIG. 5 presents an example system diagram of various hardware components and other features, for use in accordance with an aspect of the present disclosure. Computer system 500 includes one or more processors, such as processor 504. The processor 504 is connected to a communication infrastructure 506 (e.g., a communications bus, crossover bar, or network). In one example, processor 302 can include processor 504. Various software aspects are described in terms of this example computer system. After reading this description, it will become apparent to a person skilled in the relevant art(s) how to implement aspects described herein using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 can include other similar devices for allowing computer programs or other instructions to be loaded into computer system 500. Such devices can include, for example, a removable storage unit 522 and an interface 520. Examples of such can include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500. In an example, memory 304 can include one or more of main memory 508, secondary memory 510, removable storage drive 514, removable storage unit 518, removable storage unit 522, etc.

Computer system 500 can also include a communications interface 524. Communications interface 524 allows software and data to be transferred between computer system 500 and external devices. Examples of communications interface 524 can include a modem, a network interface (such as an Ethernet card), a communications port, a Personal Computer Memory Card International Association (PCMCIA) slot and card, etc. Software and data transferred via communications interface 524 are in the form of signals 528, which can be electronic, electromagnetic, optical or other signals capable of being received by communications interface 524. These signals 528 are provided to communications interface 524 via a communications path (e.g., channel) 526. This path 526 carries signals 528 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects described herein can be directed to such computer program products.

Computer programs (also referred to as computer control logic) are stored in main memory 508 and/or secondary memory 510. Computer programs can also be received via communications interface 524. Such computer programs, when executed, enable the computer system 500 to perform various features in accordance with aspects described herein. In particular, the computer programs, when executed, enable the processor 504 to perform such features. Accordingly, such computer programs represent controllers of the computer system 500. Computer programs can include segmentation component 306, image component 308, etc., as described herein.

In variations where aspects described herein are implemented using software, the software can be stored in a computer program product and loaded into computer system 500 using removable storage drive 514, hard disk drive 512, or communications interface 520. The control logic (software), when executed by the processor 504, causes the processor 504 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 6:
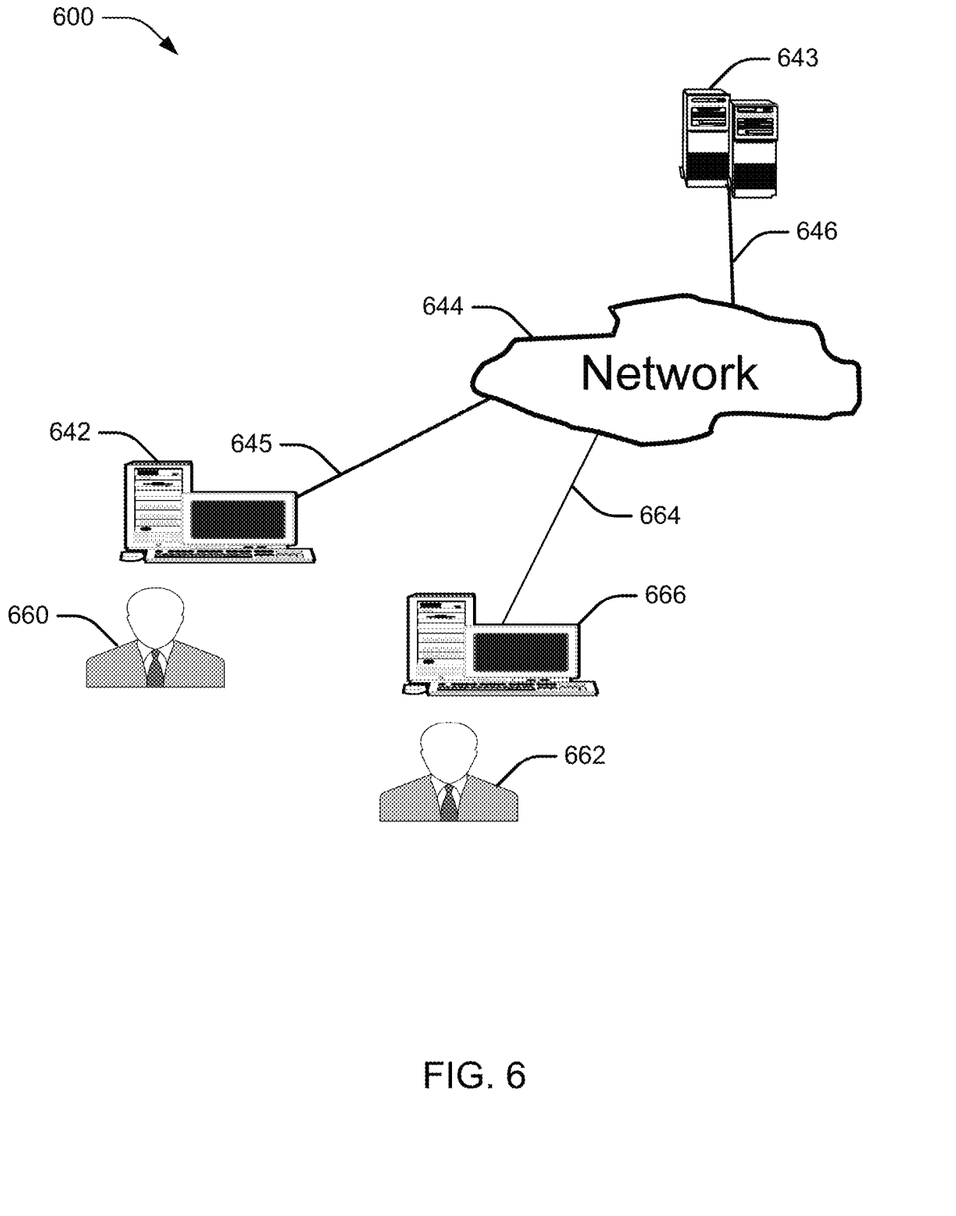
FIG. 6 is a block diagram of various example system components according to one aspect of the disclosure.

FIG. 6 is a block diagram of various example system components, in accordance with an aspect. FIG. 6 shows a communication system 600 usable in accordance with aspects described herein. The communication system 600 includes one or more accessors 660, 662 (also referred to interchangeably herein as one or more "users") and one or more terminals 642, 666. For example, terminals 642, 666 can be computing devices that may include a processor (e.g., processor 102), memory (e.g., memory 104). In one aspect, data for use in accordance with aspects described herein is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for performing segmentation of an image, comprising:
   processing the image using a plurality of convolutional layers to generate one or more feature maps;
   providing at least one of the one or more feature maps to multiple segmentation branches, wherein each of the multiple segmentation branches correspond to a different type of segmentation; and
   generating segmentations of the image based on the multiple segmentation branches, including providing feedback to, or generating feedback from, at least one of the multiple segmentation branches in performing segmentation in another of the multiple segmentation branches,
   wherein generating the segmentations of the image comprises generating a category-level segmentation of the image and generating an instance-level segmentation of the image,
   wherein generating the category-level segmentation of the image is based at least in part on features received from generating the instance-level segmentation of the image,
   wherein the features are received from an output of a pooling operation performed as part of the instance-level segmentation, and
   wherein generating the category-level segmentation of the image is based on performing a conditional random field operation on the image using at least the features from the output of the pooling operation.

2. The method of claim 1, wherein generating the segmentations of the image comprises:
   generating, based on the at least one feature map, the category-level segmentation of the image at least in part by assigning a category to multiple pixels in the image; and
   generating, based on the at least one feature map, the instance-level segmentation of the image at least in part by generating masks corresponding to instances detected in the image, wherein one or more pixels in the image are associated with the category and at least one of the masks.

3. The method of claim 1, wherein providing feedback to, or generating feedback from, at least one of the multiple segmentation branches comprises generating or updating a fully convolutional network that is utilized in performing segmentation using each of the multiple segmentation branches.

4. A method for performing segmentation of an image, comprising:
   processing the image using a plurality of convolutional layers to generate one or more feature maps;
   providing at least one of the one or more feature maps to multiple segmentation branches, wherein each of the multiple segmentation branches correspond to a different type of segmentation; and
   generating segmentations of the image based on the multiple segmentation branches, including providing feedback to, or generating feedback from, at least one of the multiple segmentation branches in performing segmentation in another of the multiple segmentation branches,
   wherein generating the segmentations of the image comprises generating an instance-level segmentation of the image based at least in part on features received from generating a category instance-level segmentation of the image,
   wherein the features are received from an output of a pooling operation performed as part of the category-level segmentation, and
   wherein generating the instance-level segmentation of the image is based on performing one or more different pooling operations on the image using at least the features from the output of the pooling operation.

5. The method of claim 4, wherein generating the segmentations of the image comprises:
   generating, based on the at least one feature map, the category-level segmentation of the image at least in part by assigning a category to multiple pixels in the image; and
   generating, based on the at least one feature map, the instance-level segmentation of the image at least in part by generating masks corresponding to instances detected in the image, wherein one or more pixels in the image are associated with the category and at least one of the masks.

6. The method of claim 4, wherein providing feedback to, or generating feedback from, at least one of the multiple segmentation branches comprises generating or updating a fully convolutional network that is utilized in performing segmentation using each of the multiple segmentation branches.

7. A computing device for generating a segmentation of an image comprising:
   a memory; and
   at least one processor coupled to the memory, wherein the at least one processor is configured to:
      process the image using a plurality of convolutional layers to generate one or more feature maps;
      provide at least one of the one or more feature maps to multiple segmentation branches, wherein each of the multiple segmentation branches correspond to a different type of segmentation; and
      generate segmentations of the image based on the multiple segmentation branches, including providing feedback to, or generating feedback from, at least one of the multiple segmentation branches in performing segmentation in another of the multiple segmentation branches,
      wherein the at least one processor is configured to generate the segmentations of the image at least in part by generating a category-level segmentation of the image and generating an instance-level segmentation of the image,
      wherein the at least one processor is configured to generate the category-level segmentation of the image based at least in part on features received from generating the instance-level segmentation of the image,
      wherein the features are received from an output of a pooling operation performed as part of the instance-level segmentation, and
      wherein the at least one processor is configured to generate the category-level segmentation of the image based on performing a conditional random field operation on the image using at least the features from the output of the pooling operation.

8. The computing device of claim 7, wherein the at least one processor is configured to generate the segmentations of the image at least in part by:
   generating, based on the at least one feature map, the category-level segmentation of the image at least in part by assigning a category to multiple pixels in the image; and
   generating, based on the at least one feature map, the instance-level segmentation of the image at least in part by generating masks corresponding to instances detected in the image, wherein one or more pixels in the image are associated with the category and at least one of the masks.

9. The computing device of claim 7, wherein the at least one processor is configured to provide feedback to, or generate feedback from, at least one of the multiple segmentation branches at least in part by generating or updating a fully convolutional network that is utilized in performing segmentation using each of the multiple segmentation branches.

10. A computing device for generating a segmentation of an image comprising:
   a memory; and
   at least one processor coupled to the memory, wherein the at least one processor is configured to:
      process the image using a plurality of convolutional layers to generate one or more feature maps;
      provide at least one of the one or more feature maps to multiple segmentation branches, wherein each of the multiple segmentation branches correspond to a different type of segmentation; and
      generate segmentations of the image based on the multiple segmentation branches, including providing feedback to, or generating feedback from, at least one of the multiple segmentation branches in performing segmentation in another of the multiple segmentation branches,
      wherein the at least one processor is configured to generate the segmentations of the image at least in part by generating an instance-level segmentation of the image based at least in part on features received from generating a category instance-level segmentation of the image,
      wherein the features are received from an output of a pooling operation performed as part of the category-level segmentation, and
      wherein the at least one processor is configured to generate the instance-level segmentation of the image based on performing one or more different pooling operations on the image using at least the features from the output of the pooling operation.

11. The computing device of claim 10, wherein the at least one processor is configured to generate the segmentations of the image at least in part by:
    generating, based on the at least one feature map, the category-level segmentation of the image at least in part by assigning a category to multiple pixels in the image; and
    generating, based on the at least one feature map, the instance-level segmentation of the image at least in part by generating masks corresponding to instances detected in the image, wherein one or more pixels in the image are associated with the category and at least one of the masks.

12. The computing device of claim 10, wherein the at least one processor is configured to provide feedback to, or generate feedback from, at least one of the multiple segmentation branches at least in part by generating or updating a fully convolutional network that is utilized in performing segmentation using each of the multiple segmentation branches.

13. A non-transitory computer-readable medium storing computer executable code for generating a segmentation of an image, the code comprising code for:
    processing the image using a plurality of convolutional layers to generate one or more feature maps;
    providing at least one of the one or more feature maps to multiple segmentation branches, wherein each of the multiple segmentation branches correspond to a different type of segmentation; and
    generating segmentations of the image based on the multiple segmentation branches, including providing feedback to, or generating feedback from, at least one of the multiple segmentation branches in performing segmentation in another of the multiple segmentation branches,
    wherein the code for generating the segmentations of the image comprises code for generating a category-level segmentation of the image and code for generating an instance-level segmentation of the image,
    wherein the code for generating the category-level segmentation of the image is based at least in part on features received from generating the instance-level segmentation of the image,
    wherein the features are received from an output of a pooling operation performed as part of the instance-level segmentation, and
    wherein the code for generating the category-level segmentation of the image is based on performing a conditional random field operation on the image using at least the features from the output of the pooling operation.

14. The non-transitory computer-readable medium of claim 13, wherein the code for generating the segmentations of the image comprises:
    code for generating, based on the at least one feature map, the category-level segmentation of the image at least in part by assigning a category to multiple pixels in the image; and
    code for generating, based on the at least one feature map, the instance-level segmentation of the image at least in part by generating masks corresponding to instances detected in the image, wherein one or more pixels in the image are associated with the category and at least one of the masks.

15. The non-transitory computer-readable medium of claim 13, wherein the code for generating is configured to provide feedback to, or generate feedback from, at least one of the multiple segmentation branches at least in part by generating or updating a fully convolutional network that is utilized in performing segmentation using each of the multiple segmentation branches.

16. A non-transitory computer-readable medium storing computer executable code for performing segmentation of an image, the code comprising code for:
    processing the image using a plurality of convolutional layers to generate one or more feature maps;
    providing at least one of the one or more feature maps to multiple segmentation branches, wherein each of the multiple segmentation branches correspond to a different type of segmentation; and
    generating segmentations of the image based on the multiple segmentation branches, including providing feedback to, or generating feedback from, at least one of the multiple segmentation branches in performing segmentation in another of the multiple segmentation branches,
    wherein the code for generating the segmentations of the image comprises code for generating an instance-level segmentation of the image based at least in part on features received from generating a category instance-level segmentation of the image,
    wherein the features are received from an output of a pooling operation performed as part of the category-level segmentation, and
    wherein the code for generating the segmentations of the image comprises code for generating the instance-level segmentation of the image based on performing one or more different pooling operations on the image using at least the features from the output of the pooling operation.

17. The non-transitory computer-readable medium of claim 16, wherein the code for generating the segmentations of the image comprises:
    code for generating, based on the at least one feature map, the category-level segmentation of the image at least in part by assigning a category to multiple pixels in the image; and
    code for generating, based on the at least one feature map, the instance-level segmentation of the image at least in part by generating masks corresponding to instances detected in the image, wherein one or more pixels in the image are associated with the category and at least one of the masks.

18. The non-transitory computer-readable medium of claim 16, wherein the code for generating is configured to provide feedback to, or generate feedback from, at least one of the multiple segmentation branches at least in part by generating or updating a fully convolutional network that is utilized in performing segmentation using each of the multiple segmentation branches.

* * * * *